United States Patent
Ishii et al.

(10) Patent No.: US 8,247,047 B2
(45) Date of Patent: Aug. 21, 2012

(54) DEEP DRAWING PACKAGING CONTAINER, DEEP DRAWING PACKAGED PRODUCT AND METHOD OF MANUFACTURING THE SAME

(75) Inventors: Hitoshi Ishii, Omitama (JP); Seiichi Ibe, Omitama (JP)

(73) Assignee: Kureha Corporation, Tokyo (JP)

( * ) Notice: Subject to any disclaimer, the term of this patent is extended or adjusted under 35 U.S.C. 154(b) by 689 days.

(21) Appl. No.: 12/311,311

(22) PCT Filed: Sep. 28, 2007

(86) PCT No.: PCT/JP2007/068996
§ 371 (c)(1),
(2), (4) Date: Mar. 26, 2009

(87) PCT Pub. No.: WO2008/038776
PCT Pub. Date: Apr. 3, 2008

(65) Prior Publication Data
US 2010/0003433 A1   Jan. 7, 2010

(30) Foreign Application Priority Data

Sep. 29, 2006 (JP) ................................ 2006-268003

(51) Int. Cl.
| | |
|---|---|
| *B29D 22/00* | (2006.01) |
| *B29D 23/00* | (2006.01) |
| *B65B 53/02* | (2006.01) |
| *B65B 47/00* | (2006.01) |
| *B32B 1/02* | (2006.01) |
| *B32B 1/08* | (2006.01) |
| *B32B 27/08* | (2006.01) |
| *B32B 27/34* | (2006.01) |
| *B29C 55/00* | (2006.01) |
| *B29C 59/02* | (2006.01) |
| *B29C 51/08* | (2006.01) |
| *B29C 43/02* | (2006.01) |
| *B29C 51/00* | (2006.01) |

(52) U.S. Cl. ...................... 428/34.9; 428/34.8; 428/35.2; 428/35.7; 428/36.91; 53/442; 53/453; 265/291; 265/292; 265/320; 265/322; 265/544; 265/553; 265/554

(58) Field of Classification Search ................. 428/34.1, 428/34.8, 34.9, 35.1, 35.2, 35.4, 35.5, 35.7, 428/36.6, 36.7, 36.9, 36.91, 36.92; 53/441, 53/442, 557, 453, 559; 264/291, 292, 320, 264/322, 544, 553, 554
See application file for complete search history.

(56) References Cited

U.S. PATENT DOCUMENTS

| 6,630,237 B2 * | 10/2003 | Rivett et al. ............. 428/355 EN |
| 2003/0157350 A1 | 8/2003 | Ueyama et al. |
| 2006/0254218 A1 | 11/2006 | Yamamoto et al. |

FOREIGN PATENT DOCUMENTS

| EP | 1 557 372 B1 | 9/2003 |
| JP | 2003-535733 | 6/2001 |
| JP | 2004-115066 | 9/2002 |
| JP | 2006-224470 | 2/2005 |
| WO | WO 2004/028920 A1 | 9/2003 |

OTHER PUBLICATIONS

International Search Report of PCT/JP2007/068996 mailed Dec. 11, 2007.

* cited by examiner

*Primary Examiner* — Walter B Aughenbaugh
(74) *Attorney, Agent, or Firm* — Oliff & Berridge, PLC

(57) ABSTRACT

A deep drawn container with a top film made of a first heat shrinkable multilayer film, and a bottom film made of a second heat shrinkable multilayer film. The deep drawn container having a drawing ratio ($D_1$) of the top film and a drawing ratio ($D_2$) of the bottom film satisfying conditions: $D_1$=1.1 to 4.0; $D_2$=1.5 to 5.0; and ($D_2/D_1$)=1.05 to 4.55. A hot-water shrinkability of the first heat shrinkable multilayer film in a longitudinal direction ($S_{M1}$) and in a transverse direction ($S_{T1}$), and a hot-water shrinkability of the second heat shrinkable multilayer film in a longitudinal direction ($S_{M2}$) and in a transverse direction ($S_{T2}$) satisfy conditions: $S_{M1}$=5 to 40%; $S_{T1}$=5 to 40%; $S_{M2}$=2 to 25%; $S_{T2}$=2 to 25%; ($S_{M1}/S_{M2}$)=1.2 to 12; and ($S_{T1}/S_{T2}$)=1.2 to 12.

8 Claims, No Drawings

DEEP DRAWING PACKAGING CONTAINER, DEEP DRAWING PACKAGED PRODUCT AND METHOD OF MANUFACTURING THE SAME

TECHNICAL FIELD

The present invention relates to a deep drawing packaging container formed by separately deep drawing a top film and a bottom film each made of a heat shrinkable multilayer film, to a deep drawing packaged product using the deep drawing packaging container and to methods for manufacturing the deep drawing packaging container and the deep drawing packaged product.

BACKGROUND OF THE INVENTION

Conventionally, as a method for packaging food such as processed meat products, seafood paste products, meats, fishes, cheeses, there are generally used a method for filling and packaging the contents into a bag or a pouch bag made of an oriented/shrinkable or a non-oriented/non-shrinkable multilayer film, and a method for filling and packaging the contents into a bag made of a multilayer film just after the bag is formed by a vertical (longitudinal) pillow/transverse (horizontal) pillow type packaging machine. However, in a packaging method using such bags, a method is used in which contents are filled in a bag followed by evacuation at a reduced pressure or vacuum in a vacuum chamber, and thereafter an opening portion is sealed to provide a packaged product, so that, in a series of operations in such bag-type vacuum packaging, increase in a filling rate has limitations. Accordingly, a method that enables an increase in filling rate has been demanded from economical and other point of view.

On the other hand, as a method easily increasing a filling rate compared with the bag-type vacuum packaging method, there is a so-called deep drawing packaging method utilizing vacuum packaging. Generally, non-oriented/non-shrinkable multilayer films are conventionally used for the deep drawing packaging method. Particularly, in the case where irregular shapes of content such as meat, a ham, a roast pork and a bacon are filled and packaged, there are drawbacks that the packaged product is easily wrinkled, and that the films lack in a fitting property for the contents, so that liquid of contents easily stays. Moreover, there is also a drawback that keeping quality of contents becomes poor. In addition, in deep drawing packaging using conventional non-oriented/non-shrinkable multilayer films, a so-called flange portion which is formed by closely attaching a top film with a bottom film not contacting to contents is excessively large, so that there is a problem that it is extremely difficult to obtain a packaging form similar to the bag-type vacuum packaging.

In order to solve these problems, International Application Japanese-Phase Publication No. 2003-535733 (Document 1) discloses a stretch-oriented multilayer film including at least three layers of: a surface layer (a) made of a thermoplastic resin; an intermediate layer (b) made of a polyamide-based resin; and a surface layer (c) made of a sealable resin. The multilayer film exhibits an impact energy of 1.5 Joule or more at a conversion thickness of 50 μm at a temperature of −10° C. In the specification, there is described a deep drawing package using such a stretch-oriented multilayer film.

However, in a deep drawing package, generally, a bottom film having multiple concave portions is formed by deep drawing, and then contents are filled into the concave portions. Then, a non-molded top film is continuously covered onto the concave portions. After the container is evacuated at a reduced pressure or vacuum in a vacuum chamber, deep drawing packaged products are continuously obtained by heat-sealing a peripheral part of an upper face of the bottom film with the top film. Accordingly, even in the deep drawing packaged product described in Document 1 and obtained by using a heat shrinkable film, a seal position of the bottom film and the top film is eccentrically located in the bottom film side. As a result, it is still difficult to obtain a packaging form similar to the bag-type vacuum packaging.

DISCLOSURE OF THE INVENTION

The present invention has been made in consideration of the above problems of the prior art, and it is an object of the present invention to provide a deep drawing packaging container and a deep drawing packaged product which are sufficiently prevented from generation of wrinkles in the packaged product even when irregular shapes of contents such as meat is filled and packaged; and which is possible to provide a packaging form similar to the bag-type vacuum packaging by providing a small flange portion because of tight fitness to contents even when a margin ratio of the packaged product is large, and by locating the seal position of the bottom film and the top film at a near-central part of the contents in a thickness direction. Another object of the present invention is to provide methods for manufacturing such a container and such a packaged product.

As a result of diligent studies with the aim of accomplishing the aforementioned objects, the present inventors come to achieve the present invention by disclosing the following facts. The above-described object can be achieved by setting a drawing ratio of the bottom film is set in predetermined range which is lager than a drawing ratio of the top film as well as by setting a hot-water shrinkability of the top film in a predetermined range which is larger than a hot-water shrinkability of the bottom film.

A deep drawing packaging container of the present invention comprises: a top film made of a first heat shrinkable multilayer film; and a bottom film made of a second heat shrinkable multilayer film, the deep drawing packaging container being formed by deep drawing, so that a drawing ratio ($D_1$) of the top film and a drawing ratio ($D_2$) of the bottom film satisfy the following conditions:

$D_1$=1.1 to 4.0;

$D_2$=1.5 to 5.0; and $(D_2/D_1)$=1.05 to 4.55, wherein a hot-water shrinkability ($S_{M1}$) in a longitudinal direction and a hot-water shrinkability ($S_{T1}$) in a transverse direction of the first heat shrinkable multilayer film and a hot-water shrinkability ($S_{M2}$) in a longitudinal direction and a hot-water shrinkability ($S_{T2}$) in a transverse direction of the second heat shrinkable multilayer film satisfy the following conditions:

$S_{M1}$=5 to 40%;

$S_{T1}$=5 to 40%;

$S_{M2}$=2 to 25%;

$S_{T2}$=2 to 25%;

$(S_{M1}/S_{M2})$=1.2 to 12; and $(S_{T1}/S_{T2})$=1.2 to 12, (where the hot-water shrinkability is a shrinkability (%) after immersing the heat shrinkable multilayer film before drawing in hot water of a temperature of 90° C. for 10 seconds).

In addition, a deep drawing packaged product of the present invention comprises: a packaging container obtained by sealing and further heat-shrinking the top film and the bottom film of the deep drawing packaging container of the present invention; and contents placed inside the packaging container.

In such a deep drawing package container and a deep drawing packaged product of the present invention, each of the first heat shrinkable multilayer film and the second heat shrinkable multilayer film preferably comprises at least an outer layer made of a first thermoplastic resin, an intermediate layer made of a polyamide-based resin and an inner layer made of a sealant resin.

Moreover, a total thickness ($T_1$) of the first heat shrinkable multilayer film before drawing and a total thickness ($T_2$) of the second heat shrinkable multilayer film before drawing more preferably satisfy the following conditions:

$T_1$=20 to 120 μm;

$T_2$=45 to 200 μm; and $(T_2/T_1)$=1.1 to 10.

A method for manufacturing a deep drawing packaging container of the present invention is a method for manufacturing a deep drawing packaging container comprising a top film made of a first heat shrinkable multilayer film and a bottom film made of a second heat shrinkable multilayer film, the method comprising the steps of:

preparing the first heat shrinkable multilayer film and the second heat shrinkable multilayer film in which a hot-water shrinkability ($S_{M1}$) in a longitudinal direction and a hot-water shrinkability ($S_{T1}$) in a transverse direction of the first heat shrinkable multilayer film and a hot-water shrinkability ($S_{M2}$) in a longitudinal direction and a hot-water shrinkability ($S_{T2}$) in a transverse direction of the second heat shrinkable multilayer film satisfy the following conditions:

$S_{M1}$=5 to 40%;

$S_{T1}$=5 to 40%;

$S_{M2}$=2 to 25%;

$S_{T2}$=2 to 25%;

$(S_{M1}/S_{M2})$=1.2 to 12; and $(S_{T1}/S_{T2})$=1.2 to 12, (where the hot-water shrinkability is a shrinkability (%) after immersing the heat shrinkable multilayer film before drawing in hot water of a temperature of 90° C. for 10 seconds); and performing deep drawing so that a drawing ratio ($D_1$) of the top film and a drawing ratio ($D_2$) of the bottom film satisfy the following conditions:

$D_1$=1.1 to 4.0;

$D_2$=1.5 to 5.0; and $(D_2/D_1)$=1.05 to 4.55.

Moreover, the method for manufacturing the deep drawing packaged product of the present invention comprises the steps of:

placing contents in a space between the top film and the bottom film of the deep drawing packaging container of the present invention, and sealing and further heat-shrinking the top film and the bottom film.

In such methods of the present invention for manufacturing the deep drawing packaging container and the deep drawing packaged product, each of the first heat shrinkable multilayer film and the second heat shrinkable multilayer film preferably comprises at least an outer layer made of a first thermoplastic resin, an intermediate layer made of a polyamide-based resin and an inner layer made of a sealant resin, and a total thickness ($T_1$) of the first heat shrinkable multilayer film before drawing and a total thickness ($T_2$) of the second heat shrinkable multilayer film before drawing more preferably satisfy the following conditions:

$T_1$=20 to 120 μm;

$T_2$=45 to 200 μm; and $(T_2/T_1)$=1.1 to 10.

According to the present invention, it is possible to provide a deep drawing packaging container and a deep drawing packaged product which sufficiently prevents generation of wrinkles in the packaged product even when irregular shapes of contents such as meat is filled and packaged; provides small flange portion because of tight fitness to contents even a margin ratio of the container being large; and is possible to be a packaging form similar to the bag-type vacuum packaging by locating the seal position of the bottom film and the top film in near-central part in a thickness direction, and a method for manufacturing the same.

DETAILED DESCRIPTION OF THE PREFERRED EMBODIMENTS

The following will specifically explain the present invention with reference to preferred embodiments. First, an explanation will be given of a deep drawing packaging container of the present invention and a method for manufacturing the same. The deep drawing packaging container of the present invention includes a top film made of a first heat shrinkable multilayer film and a bottom film made of a second heat shrinkable multilayer film.

Although the specific composition of such a heat shrinkable multilayer film is not particularly limited, each of the first heat shrinkable multilayer film and the second heat shrinkable multilayer film preferably includes at least an outer layer made of a first thermoplastic resin, an intermediate layer made of a polyamide-based resin and an inner layer made of a sealant resin.

For the first thermoplastic resin forming the outer layer, a thermoplastic resin having adequate stretchability in a lamination state with an intermediate layer made of a polyamide-based resin and low moisture-absorption properties which prohibit water penetration to the intermediate layer is preferably used. Such thermoplastic resins preferably includes: for example, polyolefin-based resins such as LLDPE (linear low density polyethylene), VLDPE (linear very low density polyethylene), LDPE (low density polyethylene), polypropylene, propylene-ethylene copolymer, propylene-ethylene-butene-1 copolymer, ethylene-vinyl acetate copolymer, ethylene-acrylic acid copolymer, ethylene-methacrylic acid copolymer, ethylene-ethyl acrylate copolymer; polyester-based resins such as aliphatic polyester-based resins, aromatic polyester-based resins (for example, polyethylene terephthalate and polybutylene terephthalate). Of these resins, the polyester-based resins are particularly preferable from a viewpoint of excellent transparency, surface hardness, printability, heat resistance and the like.

Moreover, the polyamide-based resin forming the intermediate layer can include, for example, aliphatic polyamide polymers such as nylon 6, nylon 66, nylon 11, nylon 12, nylon 69, nylon 610 and nylon 612, and aliphatic polyamide copolymers such as nylon 6/66, nylon 6/69, nylon 6/610, nylon 66/610 and nylon 6/12. Of these polyamides, nylon 6/66 and nylon 6/12 are preferable from a viewpoint of forming processability. Moreover, for such polyamide-based resins, blends of these aliphatic polyamide (co)polymers as main components with aromatic polyamides may be used. Such aromatic polyamides mean that at least one of a diamine and a dicarboxylic acid includes an aromatic unit. Examples of these aromatic polyamides include nylon 66/610/MXD6 (polymetaxylylene adipamide), nylon 66/69/6I, nylon 6/6I, nylon 66/6I and nylon 6I/6T ("nylon 6I" indicating polyhexamethylene isophthalamide and "nylon 6T" indicating polyhexamethylene terephthalamide). As for these polyamide-based resins, one species thereof may be singly used or a combination of two or more species may be used, and polyamides having a melting point of 160 to 210° C. are more preferable. Moreover, these polyamide-based resins may contain olefin-based resins modified with an acid such as maleic acid or with an anhydride thereof, ethylene-acrylic acid copolymer, ethylene-methacrylic acid copolymer, ionomer resin, and saponified ethylene-vinyl acetate copolymer up to approximately 30% by mass.

Furthermore, as the sealant resin forming the inner layer, for example, thermoplastic resins such as ethylene-α-olefin copolymers (linear low density polyethylene (LLDPE), linear very low density polyethylene (VLDPE), and the like), low density polyethylene (LDPE), ethylene-vinyl acetate copolymer (EVA), ethylene-methacrylic acid copolymer (EMAA), ethylene-methacrylic acid-unsaturated aliphatic carboxylic acid copolymer, low density polyethylene, ionomer resin (IO), ethylene-acrylic acid copolymer, ethylene-methyl acrylate copolymer (EMA), ethylene-ethyl acrylate copolymer (EAA), and ethylene-butyl acrylate copolymer (EBA) are included. Such sealant resins can be comprehensively described as ethylene copolymers, in particular copolymers which contain ethylene as a main component and ethylenic unsaturated monomers copolymerizable with ethylene as minor components. Examples of preferable ethylenic unsaturated monomers include α-olefins having 3 to 8 carbons; unsaturated carboxylic acids having 8 or fewer carbons and esters thereof such as acrylic acid, methacrylic acid, acrylic acid esters, methacrylic acid esters and vinyl acetate. Moreover, acid-modified ethylene copolymers in which ethylene copolymers are modified with unsaturated carboxylic acid of 3% by weight or less are also preferably used. The melting points of such sealant resins are preferably 150° C. or less, and particularly preferably 135° C. or less.

Heat shrinkable multilayer films suitable for the present invention includes the above-described outer layer made of the first thermoplastic resin, the intermediate layer made of a polyamide-based resin, and the inner layer made of the sealant resin. However, intermediate layers other than the intermediate layer made of a polyamide-based resin can be included for the purpose of improving functionality or processability of the multilayer films or other purposes, if necessary. Examples of such other intermediate layers include, for example, the following gas-barrier intermediate layer and the following adhesive resin layer.

Specifically, as gas-barrier resins forming a gas-barrier intermediate layer and particularly used for an oxygen-gas-barrier layer, a known saponified ethylene-vinyl acetate copolymer (EVOH); aromatic polyamides having aromatic diamine such as polymetaxylylene adipamide (nylon MXD6); amorphous aromatic polyamides having aromatic carboxylic acid such as polyhexamethylene isophthalamide/terephthalamide (nylon 6I/6T) which is the copolymer of isophthalic acid, terephthalic acid and hexamethylene diamine; and the like can be exemplified.

Moreover, when adhesion force between each layer is not sufficient, an adhesive resin layer can be provided as an intermediate layer, if necessary. As preferable adhesive resins, EVA, EEA, EAA, acid-modified polyolefin (for example, acid-modified VLDPE, acid-modified LLDPE and acid-modified LDPE), acid-modified EVA and the like can be used. Of these adhesive resins, olefin-based resins which are modified with an acid such as maleic acid, an anhydride thereof, or the like are preferably used.

Furthermore, in the above-mentioned layer composition, various types of additives such as lubricants, antistatic agents, heat stabilizers, light stabilizers, moisture-proof agents, waterproof agents, water repellents, mold release agents, coupling agents, oxygen absorbents, pigments, and dyes can be contained in any layers The deep drawing packaging container of the present invention includes the above-mentioned top film made of the first heat shrinkable multilayer film and the above-mentioned bottom film made of the second heat shrinkable multilayer film. The top film and the bottom film can be obtained by deep drawing the heat shrinkable multilayer films in the following drawing ratios.

The top film according to the present invention is obtained by deep drawing the first heat shrinkable multilayer film in a drawing ratio ($D_1$) of 1.1 to 4.0. When a thickness of contents is thin, a small drawing ratio may be acceptable. However, when the drawing ratio is less than 1.1, wrinkles may occur in a packaged product because of insufficient heat shrinkage, particularly in the case of a low value of the heat shrinkability of the film. Meanwhile, when the drawing ratio of the top film exceeds 4.0, the film may not be deep drawn because the film is torn at deep drawing.

Moreover, the bottom film according to the present invention is obtained by deep drawing the second heat shrinkable multilayer film in a drawing ratio ($D_2$) of 1.5 to 5.0. When the drawing ratio of the bottom film is less than 1.5, wrinkles may occur in a packaged product because of insufficient heat shrinkage, particularly in the case of a low value of the heat shrinkability of the film. Meanwhile, although a drawing ratio of 4.0 or more is required in the case of big- and thick-shaped contents, when the drawing ratio of the bottom film exceeds 5.0, the film may not be deep drawn because the film is torn at deep drawing.

Furthermore, for the deep drawing packaging container of the present invention, a ratio ($D_2/D_1$) of a drawing ratio ($D_2$) of the bottom film to a drawing ratio ($D_1$) of the top film needs to be in a range of 1.05 to 4.55. When this ratio is less than 1.05, the deep drawing packaged product becomes unstable during filling contents when big-shaped contents are packaged, as well as movement of an upper chamber of a packaging machine becomes bigger, so that its structure becomes large. From a viewpoint of lifetime of the machine, smaller movement is desirable. Meanwhile, when this ratio exceeds 4.55, the object of the present invention will not be achieved, because a position of a seal line is eccentrically located in the top film side.

Drawing ratios according to the present invention is determined as follows.

<Drawing Ratio>

A surface area before deep drawing and a surface area after deep drawing are both determined from a shape of a drawing mold. Then the drawing ratio is calculated from the following formula:

{Surface area after deep drawing [cm$^2$]}/{Surface area before deep drawing [cm$^2$]}=Drawing ratio [-]

In the deep drawing packaging container of the present invention, after the first heat shrinkable multilayer film (before drawing) used for the top film is immersed in hot-water at a temperature of 90° C. for 10 seconds, a hot-water shrinkability ($S_{M1}$) in a longitudinal direction and a hot-water shrinkability ($S_{T1}$) in a transverse direction both need to be 5 to 40%, more preferably 10 to 35%, and particularly preferably 5 to 30%. When the hot-water shrinkability ($S_{M1}$) in a longitudinal direction or the hot-water shrinkability ($S_{T1}$) in a transverse direction is less than 5%, wrinkle formation in the obtained packaged product can not be prevented. Meanwhile, when the hot-water shrinkability ($S_{M1}$) in a longitudinal direction or the hot-water shrinkability ($S_{T1}$) in a transverse direction exceeds 40%, deep drawing defects of causing clip unfastening because of too much shrinkage during deep drawing, causing seal defects, lowering actual drawing ratio of the film at deep drawing or the like are generated.

Moreover, after the second heat shrinkable multilayer film (before drawing) used for the bottom film is immersed in hot-water at a temperature of 90° C. for 10 seconds, a hot-water shrinkability ($S_{M2}$) in a longitudinal direction and a hot-water shrinkability ($S_{T2}$) in a transverse direction both needs to be 2 to 25%, and particularly preferably 3 to 25%. When the hot-water shrinkability ($S_{M2}$) or the hot-water shrinkability ($S_{T1}$) in a transverse direction is less than 2%, wrinkle formation in the obtained packaged product can not be prevented. Meanwhile, when the hot-water shrinkability ($S_{M2}$) or the hot-water shrinkability in a transverse direction ($S_{T1}$) exceeds 25%, deep drawing defects are generated.

Furthermore, in the deep drawing packaging container of the present invention, a ratio ($S_{M1}/S_{M2}$) of the hot-water shrinkability ($S_{M1}$) of the top film to the hot-water shrinkability ($S_{M2}$) of the bottom film and a ratio ($S_{T1}/S_{T2}$) of the hot-water shrinkability ($S_{T1}$) of the top film to the hot-water shrinkability ($S_{T2}$) of the bottom film needs to be in a range of 1.2 to 12. When this ratio is less than 1.2, wrinkle formation in the obtained packaged product can not be prevented. Meanwhile, when this ratio exceeds 12, it is difficult to obtain a packaging form similar to the bag-type vacuum packaging because a seal poison of the top film and the bottom film is eccentrically located in the top film side because of too much shrinkage of the top film.

Note that, the hot-water shrinkability according to the present invention is determined as follows.

<Hot-Water Shrinkability>

According to the method described in ASTM D2732-83, a hot-water shrinkability is determined as follows. That is, a film sample is marked at a distance of 10 cm in a mechanical direction (longitudinal direction) and in a direction (transverse direction) perpendicular to the mechanical direction of the film. The film sample is immersed in hot water with the temperature thereof adjusted to 90° C., for 10 seconds, and thereafter taken out and cooled with water at a room temperature immediately. After that, the marked distance is measured, and a hot-water shrinkability is calculated based on the following formula:

{Value reduced from 10 cm [cm]}/{10 [cm] (original length)}×100=hot-water shrinkability [%].

Then, each sample is tested five times, and an average value obtained for each of the longitudinal direction (MD) and transverse direction (TD) is expressed as a hot water shrinkability of the sample. That is, for the hot water shrinkability according to the present invention, both the hot water shrinkability in a mechanical direction (longitudinal direction) and the hot water shrinkability in a direction (transverse direction) perpendicular to the mechanical direction needs to be in a range satisfying the conditions described in claims.

Moreover, a method for obtaining a heat shrinkable multilayer film having such a hot water shrinkability is not particularly limited. For example, a heat shrinkable multilayer film satisfying the above-described conditions can be obtained by setting a relaxation ratio at forming of the heat shrinkable multilayer film used for the top film to 5 to 25% and a relaxation ratio at forming of the heat shrinkable multilayer film used for the bottom film to 10 to 30%.

In a deep drawing packaging container of the present invention, a total thickness ($T_1$) of a first heat shrinkable multilayer film used for the top film before drawing is preferably 20 to 120 μm, more preferably 30 to 100 μm, and particularly preferably 40 to 90 μm. When the total thickness ($T_1$) of a film used for a top film is less than 20 μm, there is a tendency that thickness control at film forming of the heat shrinkable multilayer film is difficult, and, as for film properties, oxygen gas permeability becomes high as well as strength becomes low. Meanwhile, when the total thickness ($T_1$) exceeds 120 μm, there is a tendency that strength of the top film becomes excessively high and the cost becomes high.

Moreover, a total thickness ($T_2$) of the second heat shrinkable multilayer film used for the bottom film before drawing is preferably 45 to 200 μm, more preferably 60 to 150 μm, and particularly preferably 70 to 140 μm. When the total thickness ($T_2$) of the film used for the bottom film is less than 50 μm, there is a tendency that deep drawing formability becomes poor, and, as for film properties, oxygen gas permeability becomes high as well as strength becomes low. Meanwhile, when the total thickness ($T_2$) exceeds 200 μm, there is a tendency that the strength of the top film becomes excessively high and the cost becomes high.

Furthermore, in the deep drawing packaging container of the present invention, a ratio ($T_2/T_1$) of the total thickness ($T_2$) of the second heat shrinkable multilayer film used for the bottom film before drawing to the total thickness ($T_1$) of the first heat shrinkable multilayer film used for the top film before drawing is preferably in a range of 1.1 to 10. When this ratio is less than 1.1, there is a tendency that a position of a seal line is eccentrically located in the top film side in the case of large shrinkability and a small drawing ratio of the top film. Meanwhile, when this ratio exceeds 10, a thickness of the top film to a thickness of the bottom film becomes too thin.

A thickness of the multilayer film according to the present invention is obtained by measuring thickness of each layer and total thickness in the cross-section of the multilayer film with an optical microscope manufactured by Olympus Corporation.

Although oxygen gas transmission rate ($O_2$TR) of the heat shrinkable multilayer film used in the present invention is not particularly limited, for example, in the case of packaging raw meat, each oxygen gas transmission rate of the heat shrinkable multilayer film used for the top film and the bottom film is preferably 1 to 100 cm$^3$/m$^2$·day·atm, more preferably 1 to 80 cm$^3$/m$^2$·day·atm, and particularly preferably 1 to 60 cm$^3$/m$^2$·day·atm under conditions of a temperature of 23° C. and of 80% RH. When the oxygen gas transmission rate exceeds 100 cm$^3$/m$^2$·day·atm, there is a tendency that storage stability is lowered by oxidation deterioration and storage for 40 days can not be achieved under a condition of 5° C. or less when raw meat is packaged.

Moreover, when cheese is packaged, each oxygen gas transmission rate of the heat shrinkable multilayer film used for the top film and the bottom film is preferably 50 to 400 cm$^3$/m$^2$·day·atm under conditions of a temperature of 23° C. and of 80% RH. When the oxygen gas transmission rate is less than 50 cm$^3$/m$^2$·day·atm, there is a tendency that appearance of a packaged product tends to deteriorate by expansion of the packaged product because of gas generated when the cheese is fermented. Meanwhile, when the oxygen gas transmission rate exceeds 400 cm$^3$/m$^2$·day·atm, there is a tendency that a storage period of cheese becomes short.

An oxygen gas transmission rate according to the present invention is determined as follows.

<Oxygen Gas Transmission Rate>

According to the method described in ASTM D3985-81, an oxygen gas transmission rate under conditions of a temperature of 23° C. and of 80% RH is measured in film state of each heat shrinkable multilayer film used for a top film and a bottom film, using MOCON PERMATRAN manufactured by MODERN CONTROL Inc. The measuring unit is "cm$^3$/m$^2$·day·atm".

Although a water vapor transmission rate (WVTR) of the heat shrinkable multilayer film used in the present invention is also not particularly limited, each water vapor transmission rate of the heat shrinkable multilayer film used for the top film and the bottom film is preferably 30 g/m$^2$·day or less, more preferably 25 g/m$^2$·day or less, and particularly preferably 20 g/m$^2$·day or less. When the water vapor transmission rate exceeds 30 g/m$^2$·day, there is a tendency that weight decrease of the contents becomes too much.

A water vapor transmission rate according to the present invention is determined as follows.

<Water Vapor Transmission Rate>

According to the method described in ASTM F1249-90, a water vapor transmission rate under conditions of a temperature of 40° C. and of 90% RH is measured in film state of each heat shrinkable multilayer film used for a top film and a bottom film, using MOCON PERMATRAN-W manufactured by MODERN CONTROL Inc. The measuring unit is "g/m$^2$·day".

Moreover, puncture strength of the heat shrinkable multilayer film used in the present invention is preferably 10N or more. When the puncture strength is less than 10N, there is a tendency that the film tends to tear in the case of packaging bony chops or the like.

Puncture strength according to the present invention is determined as follows.

<Puncture Strength>

Under atmosphere of a temperature of 23° C. and of 50% RH, a needle for puncture is stuck into a sample (multilayer film) from an outer layer at a speed of 50 mm/min using a tensile tester (TENSILON RTM-100, manufactured by ORIENTEC Co., LTD.) equipped with the needle for puncture having a hemispherical tip with a curvature radius of 0.5 mm, and a maximum value (N) up to break is defined as puncture strength. Each of the heat shrinkable multilayer films used for the top film and the bottom film in a film state is measured.

In the present invention, a deep drawing packaging container of the present invention is obtained by preparing a first heat shrinkable multilayer film and a second heat shrinkable multilayer film satisfying the above-described conditions, and deep drawing such that a drawing ratio ($D_1$) of a top film and a drawing ratio ($D_2$) of a bottom film satisfies the above-described conditions.

Moreover, a deep drawing packaged product is obtained by placing contents, which is to be filled, in a space between the top film and the bottom film of the deep drawing packaging container of the present invention, and sealing and further heat shrinking the top film and the bottom film.

In the present invention, any one of methods of a series of means in processes for obtaining a deep drawing packaged product such as a method for forming a concave portion in a top film and a bottom film by deep drawing, a method for placing contents in a space between the top film and the bottom film, a method for placing the top film and the bottom film so as to face each other, a method for sealing (preferably heat sealing) the top film and the bottom film, a method for heat shrinking the sealed top and bottom films, and a method for cutting the top film and the bottom film at predetermined position is not particularly limited, and known methods in relation to deep drawing can be optionally employed. Moreover, before sealing the top film and the bottom film, reduced pressure (vacuum) evacuation of a space between the top film and the bottom film in a vacuum chamber is preferably performed. However, gas exchange in the space with predetermined gas can be possible.

In a conventional non-oriented/non-shrinkable multilayer film, since a drawing part of the film does not shrink, contents must be filled such that a ratio of volume of the contents to a volume of the drawing mold is 90 to 95% (filling ratio=90 to 95%) in order to obtain a packaged product without wrinkles. Even so, wrinkles may occur in a part of the packaged product or seal breakage may occur when filling ratio becomes high. In contrast, according to the present invention, a packaged product having excellent appearance and no-wrinkles is obtained in a wide range of filling ratio of 50 to 95%.

That is, in the present invention, the filling ratio is preferably 50 to 95%, more preferably 60 to 95%, and particularly preferably 60 to 90%. When the filling ratio is less than 50%, there is a tendency that wrinkles are easily generated in the packaged product. Meanwhile, when the filling ratio exceeds 95%, there is a tendency that filling is difficult when contents are filled in a drawing part, and seal breakage easily occurs.

A filling ratio according to the present invention is determined as follows.

<Filling Ratio>

For a volume of contents, the contents are immersed into a water bath fully filled with water at 23° C., and a volume of the contents is determined by measuring a volume of spilled water. The filling ratio is calculated according to the following formula:

{Volume of contents [cm$^3$]}/{Total volume of concave portion (mold) of top film and concave portion (mold) of bottom film [cm$^3$]}×100=Filling ratio [%].

In the present invention, since both the top film and the bottom film are deep drawn as described above, the sealing position of the top film and the bottom film can be adjusted in wide range by adjusting a drawing ratio of the top film and the bottom film, a heat shrinkability of the top film and the bottom film, or the like. As a result, the sealing position can be adjusted so as to locate the sealing position near the center of the thickness direction of the contents. Therefore, according to the present invention, a deep drawing packaged product whose packaging form is similar to a conventional bag-type vacuum packaging can be obtained. Accordingly, a filling rate is easily improved compared with a conventional bag-type vacuum packaging, and consequently laborsaving and cost reduction become possible by obtaining the packaging form being similar to a bag-type vacuum packaging by deep drawing.

Moreover, according to the present invention, generation of wrinkles can sufficiently be prevented, and at the same time, a flange portion becomes small. Accordingly, when the deep drawing packaged product of the present invention is applied, for example, to a whole-chicken bag-type packaging, and tightly-fitted to the contents with flexibility, the whole-chicken looks as if the whole-chicken were not packaged, and this provides fresh appearance compared with a conventional package. Furthermore, when the deep drawing packaged product of the present invention is applied to a package of a box-shaped block of ham or a box-shaped block of cheese, since the same form is viewed from either a top film side or bottom film side by locating a sealing position near the center of the thickness direction of the contents, there is also an advantage that sales persons can easily display the commercial products.

EXAMPLES

The following will specifically explain the present invention based on Examples and Comparative Examples, but the present invention is not limited to the following Examples. Additionally, the following Table 1 collectively shows resins used in Examples and Comparative Examples are shown together with their abbreviations. Moreover, Tables 2 to 5 collectively shows compositions, physical properties and measured values of heat shrinkable multilayer films used in Examples 1 to 9 and Comparative Examples 1 to 4 and 7.

Example 1

In order to achieve the layer structures of PET (3)/M-PE-1 (2)/Ny-1 (11)/EVOH (4)/M-PE-1 (2)/VLDPE (20) where the layers were formed from the outer side to the inner side sequentially with a thickness ratio of layers indicated in the parentheses, the respective resins were extruded by plural extruders. Then, melted resins were introduced to an annular die, and the introduced resins were adhered to obtain the aforementioned layer structure. Thus, co-extrusion process was performed. A melted tubular body extruded from an outlet of the die is cooled with water at 15 to 25° C. using cooling showering to obtain a parison. The obtained parison was passed through a hot water bath at 89° C. to thereafter obtain a tubular film. The tubular film was biaxially stretched in a longitudinal direction (MD) with a stretching ratio of 2.8 times and in a transverse direction (TD) with an stretching ratio of 3.1 times simultaneously by an inflation method while being cooled by airing at 15 to 20° C. Then, the obtained biaxially oriented film was guided into a heat treatment tower having a tube length of 2 m to obtain a tubular film. The tubular film was heated at 68° C. with steam blown from a blowout opening and the heated film is subjected to heat treatment for 2 seconds while being relaxed by 10% in the longitudinal direction and by 10% in the transverse direction to obtain a top film (A) of a biaxially oriented film (a stretch-oriented multilayer film).

Moreover, a bottom film (a) of a biaxially oriented film (a stretch-oriented multilayer film) was obtained in the same way as the top film (A) except that layer structure, film thickness and film forming (stretching-relaxation) conditions were changed as described in Table 2.

A hot-water shrinkability, puncture strength, an oxygen gas transmission rate ($O_2$TR), and a water vapor transmission rate were measured for each of the obtained top and bottom films. Furthermore, evaluation of a packaging test for a box-shaped block of ham was conducted as a practical test. Table 2 shows the obtained results.

<Packaging Test for a Box-Shaped Block of Ham>

The bottom film was deep drawn by a mold for the bottom film (longitudinal direction: 100 mm, transverse direction: 110 mm, depth: 40 mm) under conditions of a forming temperature of 85° C., a forming time of 2.0 seconds, a degree of vacuum of 10 mbar and a drawing ratio of 2.5 using a deep drawing machine R550 manufactured by Multivac Sepp Haggenmüller GmbH & Co. The box-shaped block of ham (longitudinal direction: 90 mm, transverse direction: 100 mm, height: 60 mm, weight: approximately 600 g) was placed as the content in the formed concave portion. Moreover, the top film was deep drawn by a mold for the top film (longitudinal direction: 100 mm, transverse direction: 110 mm, depth: 30 mm) under conditions of a forming temperature of 85° C., a forming time of 2.0 seconds, a degree of vacuum of 10 mbar and a drawing ratio of 2.1. The top film was oppositely placed on the bottom film filled with the content, and the top film and the bottom film were heat sealed under conditions of 130° C. for 2 seconds in a vacuum chamber while the inside was being evacuated. Then, after the top film and the bottom film were cut so as to form a flange portion with a length at the cutting of 30 mm, the obtained product was immersed into a shrinker (hot water bath) for heat shrinking under conditions of 85° C. for 1 second to obtain a deep drawing packaged product.

Then, the appearance of the obtained deep drawing packaged product was evaluated in terms of the following three evaluation categories based on the following judging standards. Table 2 shows the obtained results.

(1) Length of Flange Portion in Packaged Product

A: A length of flange portion except opening part of the packaged product to the length of flange portion at cutting (original dimension of cut length) is less than 70%. The result is good.

C: A length of flange portion to the length of flange portion at cutting (original dimension of cut length) is 70% or more. The result is poor.

(2) Wrinkles in Packaged Product Surface

A: No wrinkles exist on the surfaces except the side surface of the packaged product, and the appearance of the packaged product is smooth.

B: 1 to 5 wrinkle(s) are generated on the surfaces except the side surface of the packaged product.

C: More than 6 wrinkles are generated on the surfaces except the side surface of the packaged product.

(3) Sealing Position in Side Surface

A: A sealing position of the top film and the bottom film is located within a range of ±35% from the center of the thickness direction of the content having the height of 60 mm, and the packaging form is similar to a bag-type vacuum packaging.

C: A sealing position of the top film and the bottom film is located out of a range of ±35% from the center of the thickness direction of the content having the height of 60 mm, and the packaging form is not similar to a bag-type vacuum packaging.

Examples 2 to 9

A top film and a bottom film used in each Example were obtained in the same way as Example 1 except that layer structure, film thickness and film forming (stretching-relaxation) conditions were changed as described in Tables 2 to 4. Each property was measured in the same way as Example 1 for the obtained top films and bottom films, and the practical test was further conducted. Tables 2 to 4 show the obtained results.

Comparative Example 1

In order to achieve the layer structures of PE (17)/M-PE-1 (4)/Ny-1 (2)/EVOH (6)/Ny-1 (2)/M-PE-1 (4)/LLDPE (25) where the layers were formed from the outer side to the inner side sequentially with a thickness ratio of layers indicated in the parentheses, the respective resins were extruded by plural extruders. Then, melted resins were introduced to a T-die, and the introduced resins were adhered to obtain the aforementioned layer structure. Thus, co-extrusion process was performed to form a multilayer film. Then, the obtained multilayer film was laminated with a biaxially oriented nylon film (shrinkable, O-Ny) to obtain a top film (G). Meanwhile, the bottom film (a) obtained in Example 1 is used as a bottom film. Each property was measured in the same way as Example 1 for the obtained top and bottom films, and the practical test was further conducted. Table 4 shows the obtained results.

Comparative Example 2

A Top film and a bottom film used in this Comparative Example were obtained in the same way as Example 1 except that layer structure, film thickness and film forming (stretching-relaxation) conditions were changed as described in Table 4. Each property was measured in the same way as Example 1 for the obtained top and bottom films, and the practical test was further conducted. Table 4 shows the obtained results.

TABLE 1

| Abbreviation | Resin name | Manufacturer and grade | Crystal Melting point (° C.) | Remarks |
|---|---|---|---|---|
| Ny-1 | Nylon 6-66 copolymer: Copolymer ratio = 80-20% by weight | Ube Industries, Ltd. UBE Nylon 5034B | 195 | Relative viscosity = 4.5 |
| Ny-2 | Nylon 6 homopolymer | Toray Industries, Inc. Amilan CM1041-LO | 225 | — |
| Ny-3 | Amorphous nylon made of nylon 6I-6T copolymer: Density = 1.18 g/cm$^3$ | EMS-CHEMIE Ltd. Grivory G21 | Not observed | Glass transition point = 125° C. |
| Ny-4 | Ny2 (70% by weight) + Ny3 (30% by weight) | — | — | — |
| O-Ny | Biaxially oriented nylon film | KOHJIN Co., Ltd. | — | Slightly shrink nylon |
| PET | Ethylene terephthalate/isophthalate copolymer: In acid components of copolyester, isophthalic acid content = 12% by mole terephthalic acid content = 88% by mole | Bell Polyester Products, Inc. Bellpet IFG-8L | 228 | Limiting viscosity = 0.80 |
| EVOH | Saponified ethylene-vinyl acetate copolymer: Ethylene content = 47% by mole | KURARAY CO., LTD. EVAL EPG156B | 160 | MFR = 6.5 g/10 min |
| VLDPE | Ethylene-octene copolymer: density = 0.904 g/cm$^3$ | Dow Chemical Co. ATTANE 4404G | 124 | — |
| LLDPE | Ethylene-octene copolymer: density = 0.916 g/cm$^3$ | Idemitsu Sekiyu Kagaku Co. Ltd. MORETEC 0238CN | 122 | MFR = 2.0 g/10 min |
| M-PE-1 | Ultra low density polyethylene modified by an unsaturated carboxylic acid | Mitsui Chemicals, Inc. Admer SF730 | — | MFR = 2.7 g/10 min |
| PE | Low density polyethylene | Mitsui Polychemicals Company, Ltd. MIRASON B-324 | 108 | MFR = 1.3 g/10 min |

TABLE 2

| | | | Example 1 | | Example 2 | |
|---|---|---|---|---|---|---|
| | | | Top film (A) | Bottom film (a) | Top film (A) | Bottom film (b) |
| Item | | Unit | | | | |
| Material composition of film | | | | | | |
| 1st layer | Thickness | (μm) | PET 3 | PET 3 | PET 3 | PET 3 |
| 2nd layer | | | M-PE-1 2 | M-PE-1 2 | M-PE-1 2 | M-PE-1 2 |
| 3rd layer | | | Ny-1 11 | Ny-1 26 | Ny-1 11 | Ny-1 13 |
| 4th layer | | | EVOH 4 | EVOH 7 | EVOH 4 | EVOH 4 |
| 5th layer | | | M-PE-1 2 | M-PE-1 2 | M-PE-1 2 | M-PE-1 2 |
| 6th layer | | | VLDPE 20 | LLDPE 50 | VLDPE 20 | LLDPE 25 |
| 7th layer | | | — | — | — | — |
| 8th layer | | | — | — | — | — |
| Total thickness | | (μm) | 42 | 90 | 42 | 49 |
| Stretching ratio | MD/TD | (times) | 2.8/3.1 | 2.6/3.0 | 2.8/3.1 | 2.6/3.0 |
| Heating bath temperature | | (° C.) | 89 | 90 | 89 | 90 |
| Heat treatment temperature | | (° C.) | 68 | 90 | 68 | 90 |
| Heat treatment relaxation ratio | MD/TD | (%) | 10/10 | 20/20 | 10/10 | 20/20 |

TABLE 2-continued

| Item | | Unit | | | | |
|---|---|---|---|---|---|---|
| Hot-water shrinkability | MD/TD | (%) | 23/29 | 3/7 | 23/29 | 17/20 |
| Ratio of hot-water shrinkabilities of top/bottom: MD (top/bottom)/TD (top/bottom) | | (—) | | 7.7/4.1 | | 1.5/1.5 |
| Puncture strength | | (N) | 16 | 29 | 16 | 21 |
| O₂TR | | (cm³/m² · day · atm) | 20 | 9 | 20 | 20 |
| WVTR | | (g/m² · day) | 20 | 9 | 20 | 19 |
| <Packaging test of box-shaped block of ham> | | | | | | |
| Shrinkage of packaged product flange part | | | | A | | A |
| Wrinkles in packaged product surface | | | | A | | A |
| Seal position in side surface | | | | A | | A |

|  |  |  | Example 3 | | Example 4 | |
|---|---|---|---|---|---|---|
|  |  |  | Top film (A) | Bottom film (c) | Top film (B) | Bottom film (d) |
| Item | | Unit | | | | |
| Material composition of film | | | | | | |
| 1st layer | Thickness | (μm) | PET 3 | PET 6 | PET 3 | PET 3 |
| 2nd layer | | | M-PE-1 2 | M-PE-1 3 | M-PE-1 2 | M-PE-1 2 |
| 3rd layer | | | Ny-1 11 | Ny-4 33 | Ny-1 11 | Ny-1 15 |
| 4th layer | | | EVOH 4 | EVOH 7 | M-PE-1 2 | M-PE-1 2 |
| 5th layer | | | M-PE-1 2 | M-PE-1 3 | VL + LL1) 30 | VL + LL1) 50 |
| 6th layer | | | VLDPE 20 | VLDPE 78 | — | — |
| 7th layer | | | — | — | — | — |
| 8th layer | | | — | — | — | — |
| Total thickness | | (μm) | 42 | 130 | 48 | 72 |
| Stretching ratio | MD/TD | (times) | 2.8/3.1 | 2.6/3.0 | 2.6/3.0 | 2.6/2.9 |
| Heating bath temperature | | (° C.) | 89 | 90 | 90 | 90 |
| Heat treatment temperature | | (° C.) | 68 | 85 | 90 | 85 |
| Heat treatment relaxation ratio | MD/TD | (%) | 10/10 | 20/20 | 20/20 | 25/25 |
| Hot-water shrinkability | MD/TD | (%) | 23/29 | 10/13 | 16/16 | 2/4 |
| Ratio of hot-water shrinkabilities of top/bottom: MD (top/bottom)/TD (top/bottom) | | (—) | | 2.3/2.2 | | 8.0/4.0 |
| Puncture strength | | (N) | 16 | 32 | 15 | 21 |
| O₂TR | | (cm³/m² · day · atm) | 20 | 8 | 150 | 110 |
| WVTR | | (g/m² · day) | 20 | 5 | 17 | 11 |
| <Packaging test of box-shaped block of ham> | | | | | | |
| Shrinkage of packaged product flange part | | | | A | | A |
| Wrinkles in packaged product surface | | | | A | | A |
| Seal position in side surface | | | | A | | A |

Note:
1) "VL + LL" means a blend of 50% by weight of VLDPE and 50% by weight of LLDPE

TABLE 3

|  |  |  | Example 5 | | Example 6 | |
|---|---|---|---|---|---|---|
|  |  |  | Top film (C) | Bottom film (e) | Top film (C) | Bottom film (a) |
| Item | | Unit | | | | |
| Material composition of film | | | | | | |
| 1st layer | Thickness | (μm) | PET 3 | PET 3 | PET 3 | PET 3 |
| 2nd layer | | | M-PE-1 2 | M-PE-1 2 | M-PE-1 2 | M-PE-1 2 |
| 3rd layer | | | Ny-4 11 | Ny-4 23 | Ny-4 11 | Ny-1 26 |
| 4th layer | | | EVOH 4 | EVOH 9 | EVOH 4 | EVOH 7 |

TABLE 3-continued

| | | | | | | | | |
|---|---|---|---|---|---|---|---|---|
| 5th layer | | | M-PE-1 | 2 | M-PE-1 | 2 | M-PE-1 | 2 | M-PE-1 | 2 |
| 6th layer | | | VLDPE | 20 | LLDPE | 50 | VLDPE | 20 | LLDPE | 50 |
| 7th layer | | | — | | — | | — | | — | |
| 8th layer | | | — | | — | | — | | — | |
| Total thickness | | (μm) | 42 | | 89 | | 42 | | 90 | |
| Stretching ratio | MD/TD | (times) | 2.6/3.0 | | 2.6/3.0 | | 2.6/3.0 | | 2.6/3.0 | |
| Heating bath temperature | | (° C.) | 86 | | 85 | | 86 | | 90 | |
| Heat treatment temperature | | (° C.) | 85 | | 85 | | 85 | | 90 | |
| Heat treatment relaxation ratio | MD/TD | (%) | 5/5 | | 25/23 | | 5/5 | | 20/20 | |
| Hot-water shrinkability | MD/TD | (%) | 33/38 | | 13/16 | | 33/38 | | 3/7 | |
| Ratio of hot-water shrinkabilities of top/bottom: MD (top/bottom)/TD (top/bottom) | | (—) | | | 2.5/2.4 | | | | 11.0/5.4 | |
| Puncture strength | | (N) | 19 | | 28 | | 19 | | 29 | |
| O₂TR | | (cm³/m² · day · atm) | 18 | | 7 | | 18 | | 9 | |
| WVTR | | (g/m² · day) | 18 | | 8 | | 18 | | 9 | |
| <Packaging test of box-shaped block of ham> | | | | | | | | | | |
| Shrinkage of packaged product flange part | | | | | A | | | | A | |
| Wrinkles in packaged product surface | | | | | A | | | | A | |
| Seal position in side surface | | | | | A | | | | A | |

| | | Example 7 | | Example 8 | |
|---|---|---|---|---|---|
| | | Top film | Bottom film | Top film | Bottom film |
| Item | Unit | (D) | (f) | (E) | (b) |
| Material composition of film | | | | | |
| 1st layer  Thickness (μm) | | PET 3 | PET 3 | PET 2 | PET 3 |
| 2nd layer | | M-PE-1 2 | M-PE-1 3 | M-PE-1 2 | M-PE-1 2 |
| 3rd layer | | Ny-1 23 | Ny-1 55 | Ny-1 8 | Ny-1 13 |
| 4th layer | | EVOH 9 | EVOH 9 | EVOH 4 | EVOH 4 |
| 5th layer | | M-PE-1 2 | M-PE-1 2 | M-PE-1 2 | M-PE-1 2 |
| 6th layer | | LLDPE 50 | LLDPE 100 | LLDPE 10 | LLDPE 25 |
| 7th layer | | — | — | — | — |
| 8th layer | | — | — | — | — |
| Total thickness (μm) | | 89 | 171 | 28 | 49 |
| Stretching ratio MD/TD (times) | | 2.6/3.0 | 2.6/3.0 | 2.8/3.1 | 2.6/3.0 |
| Heating bath temperature (° C.) | | 85 | 90 | 89 | 90 |
| Heat treatment temperature (° C.) | | 85 | 90 | 68 | 90 |
| Heat treatment relaxation ratio MD/TD (%) | | 10/10 | 20/20 | 10/10 | 20/20 |
| Hot-water shrinkability MD/TD (%) | | 30/30 | 18/20 | 30/33 | 17/20 |
| Ratio of hot-water shrinkabilities of top/bottom: MD (top/bottom)/TD (top/bottom) (—) | | | 1.7/1.5 | | 1.8/1.7 |
| Puncture strength (N) | | 30 | 42 | 16 | 21 |
| O₂TR (cm³/m² · day · atm) | | 7 | 7 | 20 | 20 |
| WVTR (g/m² · day) | | 8 | 5 | 20 | 19 |
| <Packaging test of box-shaped block of ham> | | | | | |
| Shrinkage of packaged product flange part | | | A | | A |
| Wrinkles in packaged product surface | | | A | | A |
| Seal position in side surface | | | A | | A |

TABLE 4

| | | Example 9 | | Comparative Example 1 | | Comparative Example 2 | |
|---|---|---|---|---|---|---|---|
| | | Top film | Bottom film | Top film | Bottom film | Top film | Bottom film |
| Item | Unit | (F) | (a) | (G) | (a) | (C) | (g) |
| Material composition of film | | | | | | | |
| 1st layer  Thickness (μm) | | PET 3 | PET 3 | o-Ny 15 | PET 3 | PET 3 | PET 3 |
| 2nd layer | | M-PE-1 2 | M-PE-1 2 | PE 17 | M-PE-1 2 | M-PE-1 2 | M-PE-1 2 |
| 3rd layer | | Ny-1 24 | Ny-1 26 | M-PE-1 4 | Ny-1 26 | Ny-4 11 | Ny-1 23 |
| 4th layer | | EVOH 7 | EVOH 7 | Ny-1 2 | EVOH 7 | EVOH 4 | EVOH 9 |

TABLE 4-continued

| | | | | | | | | | | | | | |
|---|---|---|---|---|---|---|---|---|---|---|---|---|---|
| 5th layer | | | M-PE-1 | 2 | M-PE-1 | 2 | EVOH | 6 | M-PE-1 | 2 | M-PE-1 | 2 | M-PE-1 | 2 |
| 6th layer | | | VLDPE | 42 | LLDPE | 50 | Ny-1 | 2 | LLDPE | 50 | VLDPE | 20 | LLDPE | 50 |
| 7th layer | | | — | | — | | M-PE-1 | 4 | — | | — | | — | |
| 8th layer | | | — | | — | | LLDPE | 25 | — | | — | | — | |
| Total thickness | | (μm) | 80 | | 90 | | 75 | | 90 | | 42 | | 89 | |
| Stretching ratio | MD/TD | (times) | 2.8/3.0 | | 2.6/3.0 | | — | | 2.6/3.0 | | 2.6/3.0 | | 2.9/3.1 | |
| Heating bath temperature | | (° C.) | 90 | | 90 | | — | | 90 | | 86 | | | |
| Heat treatment temperature | | (° C.) | 90 | | 90 | | — | | 90 | | 85 | | 95 | |
| Heat treatment relaxation ratio | MD/TD | (%) | 15/15 | | 20/20 | | — | | 20/20 | | 5/5 | | 22/23 | |
| Hot-water shrinkability | MD/TD | (%) | 10/9 | | 3/7 | | 5/4 | | 3/7 | | 33/38 | | 5/3 | |
| Ratio of hot-water shrinkabilities of top/bottom: MD (top/bottom)/TD (top/bottom) | | (—) | 3.3/1.29 | | | | 1.7/0.6 | | | | 6.6/12.7 | | | |
| Puncture strength (N) | | (N) | 22 | | 29 | | 13 | | 29 | | 19 | | 25 | |
| $O_2$TR | | ($cm^3/m^2 \cdot day \cdot atm$) | 9 | | 9 | | 15 | | 9 | | 18 | | 15 | |
| WVTR | | ($g/m^2 \cdot day$) | 10 | | 9 | | 9 | | 9 | | 18 | | 8 | |
| <Packaging test of box-shaped block of ham> | | | | | | | | | | | | | | |
| Shrinkage of packaged product flange part | | | A | | | | C | | | | A | | | |
| Wrinkles in packaged product surface | | | A | | | | C | | | | A | | | |
| Seal position in side surface | | | A | | | | A | | | | C | | | |

TABLE 5

| | | Comparative Example 3 | | Comparative Example 4 | | Comparative Example 7 | |
|---|---|---|---|---|---|---|---|
| Item | Unit | Top film (A) | Bottom film (h) | Top film (A) | Bottom film (i) | Top film (H) | Bottom film (j) |
| Material composition of film | | | | | | | |
| 1st layer Thickness (μm) | | PET 3 | PET 2 | PET 3 | PET 3 | PET 2 | PET 2 |
| 2nd layer | | M-PE-1 2 | M-PE-1 1 | M-PE-1 2 | M-PE-1 2 | M-PE-1 2 | M-PE-1 2 |
| 3rd layer | | Ny-1 11 | Ny-4 9 | Ny-1 11 | Ny-4 23 | Ny-4 14 | Ny-1 15 |
| 4th layer | | EVOH 4 | EVOH 4 | EVOH 4 | EVOH 9 | EVOH 9 | EVOH 9 |
| 5th layer | | M-PE-1 2 | M-PE-1 1 | M-PE-1 2 | M-PE-1 2 | M-PE-1 2 | M-PE-1 2 |
| 6th layer | | VLDPE 20 | VLDPE 13 | VLDPE 20 | VLDPE 50 | LLDPE 35 | LLDPE 35 |
| 7th layer | | — | — | — | — | — | — |
| 8th layer | | — | — | — | — | — | — |
| Total thickness (μm) | | 42 | 30 | 42 | 89 | 64 | 65 |
| Stretching ratio MD/TD (times) | | 2.8/3.1 | 2.8/3.1 | 2.8/3.0 | 2.6/3.0 | 3.0/3.0 | 3.0/3.0 |
| Heating bath temperature (° C.) | | 89 | 89 | 89 | 90 | — | — |
| Heat treatment temperature (° C.) | | 68 | 68 | 68 | — | 90 | 90 |
| Heat treatment relaxation ratio MD/TD (%) | | 10/10 | 10/10 | 10/10 | — | 15/27 | 15/27 |
| Hot-water shrinkability MD/TD (%) | | 23/29 | 22/27 | 23/29 | 35/41 | 10/8 | 10/8 |
| Ratio of hot-water shrinkabilities of top/bottom: MD (top/bottom)/TD (top/bottom) | (—) | 1.05/1.07 | | 0.66/0.76 | | 1.0/1.0 | |
| Puncture strength (N) | (N) | 19 | 14 | 19 | 26 | 27 | 27 |
| $O_2$TR | ($cm^3/m^2 \cdot day \cdot atm$) | 18 | 21 | 18 | 10 | — | — |
| WVTR | ($g/m^2 \cdot day$) | 20 | 26 | 20 | 11 | — | — |
| <Packaging test of box-shaped block of ham> | | | | | | | |
| Shrinkage of packaged product flange part | | — | | — | | — | |
| Wrinkles in packaged product surface | | — | | — | | — | |
| Seal position in side surface | | — | | — | | — | |

As being obvious from the results shown in Tables 2 to 4, all results of each physical property and packaging test for the box-shaped block of ham were excellent for the deep drawing packaged products of the present invention (Examples 1 to 9) using the deep drawing packaging containers of the present invention. Meanwhile, as being obvious from the results shown in table 4, for the deep drawing packaged product of Comparative Example 1 which did not satisfy the conditions according to the present invention, shrinkage of the flange portion was insufficient, and furthermore, many wrinkles were generated in the surface of the packaged product, so that the result was unsatisfactory. Moreover, for the deep drawing packaged product of Comparative Example 2 which did not satisfy the conditions according to the present invention, the sealing position of the top film and the bottom film is eccentrically located in the top film side, so that the result was unsatisfactory.

Comparative Example 3

A top film and a bottom film used in this Comparative Example was obtained in the same way as Example 1 except that layer structure, film thickness and film forming (stretching-relaxation) conditions were changed as described in Table 5. A deep drawing packaged product made of the obtained the top film and the bottom film was tried to be obtained in the same way as Example 1. However, the deep drawing packaged product could not be obtained because of generation of film rupture (tearing) at drawing of the bottom film.

Comparative Example 4

A top film and a bottom film used in this Comparative Example was obtained in the same way as Example 1 except that layer structure, film thickness and film forming (stretching-relaxation) conditions were changed as described in Table 5. That is, the bottom film was used without heat relaxation treatment. A deep drawing packaged product made of the obtained top and bottom films was tried to be obtain in the same as Example 1. However, the deep drawing packaged product could not be obtained because clamp unfastening and drawing fault (a phenomenon of being not able to draw in a close shape to the mold shape) occurred due to the large shrinkability (stress) at drawing of the bottom film.

Example 10

A bottom film (c) obtained in Example 3 was deep drawn by a mold for the bottom film (longitudinal direction: 310 mm, transverse direction: 160 mm, depth: 100 mm) under conditions of a forming temperature of 85° C., a forming time of 2.0 seconds, a degree of vacuum of 10 mbar and a drawing ratio of 2.8 using a deep drawing machine R550 manufactured by Multivac Sepp Haggenmüller GmbH & Co. Raw meat (longitudinal direction: approximately 300 mm, transverse direction: approximately 150 mm, height: approximately 120 mm, weight: approximately 5.0 kg) was placed as the content in the formed concave portion. Moreover, a top film (A) obtained in Example 3 was deep drawn by a mold for the top film (longitudinal direction: 310 mm, transverse direction: 160 mm, depth: 40 mm) under conditions of a forming temperature of 85° C., a forming time of 2.0 seconds, a degree of vacuum of 10 mbar and a drawing ratio of 1.6. The top film was oppositely placed on the bottom film filled with the content, and the top film and the bottom film were heat sealed under conditions of 130° C. for 2 seconds in a vacuum chamber while the inside was being evacuated. Then, after the top film and the bottom film were cut so as to form a flange portion with a length at the cutting of 30 mm, the obtained product was immersed into a shrinker (hot water bath) for heat shrinking under conditions of 85° C. for 1 second to obtain the deep drawing packaged product.

For the obtained deep drawing packaged product of the present invention, there were no wrinkles and a length of the flange portion after shrinkage is shorter than 20 mm. Moreover, it was recognized that the sealing position of the top film and the bottom film was located within a range of ±35% from the center of the thickness direction of the content, and the packaging form was similar to a bag-type vacuum packaging.

Example 11

A bottom film (c) obtained in Example 3 was deep drawn by a mold for the bottom film (longitudinal direction: 250 mm, transverse direction: 200 mm, depth: 90 mm) under conditions of a forming temperature of 85° C., a forming time of 2.0 seconds, a degree of vacuum of 10 mbar and a drawing ratio of 2.4 using a deep drawing machine R550 manufactured by Multivac Sepp Haggenmüller GmbH & Co. A whole-chicken (weight: approximately 1.0 kg) was placed as the content in the formed concave portion. Moreover, a top film (A) obtained in Example 3 was deep drawn by a mold for the top film (longitudinal direction: 250 mm, transverse direction: 200 mm, depth: 40 mm) under conditions of a forming temperature of 85° C., a forming time of 2.0 seconds, a degree of vacuum of 10 mbar and a drawing ratio of 1.6. The top film was oppositely placed on the bottom film filled with the content, and the top film and the bottom film were heat sealed under conditions of 130° C. for 2 seconds in a vacuum chamber while the inside was being evacuated. Then, after the top film and the bottom film were cut so as to form a flange portion with a length at the cutting of 20 mm, the obtained product was immersed into a shrinker (hot water bath) for heat shrinking under conditions of 85° C. for 1 second to obtain the deep drawing packaged product.

For the obtained deep drawing packaged product of the present invention, there were no wrinkles and a length of the flange portion after shrinkage was shorter than 14 mm. Moreover, it was recognized that the sealing position of the top film and the bottom film was located within a range of ±35% from the center of the thickness direction of the content, and the packaging form was similar to a bag-type vacuum packaging.

Example 12

A bottom film (d) obtained in Example 4 was deep drawn by a mold for the bottom film (longitudinal direction: 130 mm, transverse direction: 340 mm, depth: 70 mm) under conditions of a forming temperature of 85° C., a forming time of 2.0 seconds, a degree of vacuum of 10 mbar and a drawing ratio of 1.79 using a deep drawing machine R550 manufactured by Multivac Sepp Haggenmüller GmbH & Co. A block of cheese (longitudinal direction: approximately 120 mm, transverse direction: approximately 330 mm, height: approximately 100 mm, weight: approximately 4 kg) was placed as the content in the formed concave portion. Moreover, a top film (B) obtained in Example 4 was deep drawn by a mold for the top film (longitudinal direction: 130 mm, transverse direction: 340 mm, depth: 40 mm) under conditions of a forming temperature of 85° C., a forming time of 2.0 seconds, a degree of vacuum of 10 mbar and a drawing ratio of 1.56. The top film was oppositely placed on the bottom film filled with the content, and the top film and the bottom film were heat sealed under conditions of 130° C. for 2 seconds in a vacuum chamber while the inside was being evacuated. Then, after the top film and the bottom film were cut so as to form a flange portion with a length at the cutting of 30 mm, the obtained product was immersed into a shrinker (hot water bath) for heat shrinking under conditions of 85° C. for 1 second to obtain the deep drawing packaged product.

For the obtained deep drawing packaged product of the present invention, there were no wrinkles and a length of the flange portion after shrinkage is shorter than 10 mm. Moreover, it was recognized that the sealing position of the top film and the bottom film was located in the top film side at 20% from the center of the thickness direction of the content, and the packaging form was similar to a bag-type vacuum packaging.

Comparative Example 5

A bottom film (a) obtained in Comparative Example 1 was deep drawn by a mold for the bottom film (longitudinal direction: 320 mm, transverse direction: 185 mm, depth: 50 mm) under conditions of a forming temperature of 85° C., a forming time of 2.0 seconds, a degree of vacuum of 10 mbar and a drawing ratio of 1.5 using a deep drawing machine R550 manufactured by Multivac Sepp Haggenmüller GmbH & Co. Raw meat (longitudinal direction: approximately 310 mm, transverse direction: approximately 150 mm, height: approximately 80 mm, weight: approximately 4.0 kg) was placed as the content in the formed concave portion. Moreover, a top film (G) obtained in Comparative Example 1 was deep drawn by a mold for the top film (longitudinal direction: 320 mm, transverse direction: 185 mm, depth: 40 mm) under conditions of a forming temperature of 85° C., a forming time of 2.0 seconds, a degree of vacuum of 10 mbar and a drawing ratio of 1.3. The top film was oppositely placed on the bottom film filled with the content, and the top film and the bottom film were heat sealed under conditions of 130° C. for 2 seconds in a vacuum chamber while the inside was being evacuated. Then, after the top film and the bottom film were cut so as to form a flange portion with a length at the cutting of 30 mm, the obtained product was immersed into a shrinker (hot water bath) for heat shrinking under conditions of 85° C. for 1 second to obtain the deep drawing packaged product.

For the obtained deep drawing packaged product which did not satisfy the conditions according to the present invention, it was recognized that many wrinkles are generated in the surface because the flange portion did not shrink and more than 25 cm of the flange portion was left, and furthermore, shrinkage of the top film was insufficient.

Comparative Example 6

A bottom film (g) obtained in Comparative Example 2 was deep drawn by a mold for the bottom film (longitudinal direction: 250 mm, transverse direction: 200 mm, depth: 80 mm) under conditions of a forming temperature of 85° C., a forming time of 2.0 seconds, a degree of vacuum of 10 mbar and a drawing ratio of 2.5 using a deep drawing machine R550 manufactured by Multivac Sepp Haggenmüller GmbH & Co. A whole-chicken (weight: approximately 1.0 kg) was placed as the content in the formed concave portion. Moreover, A top film (C) obtained in Comparative Example 2 was deep drawn by a mold for the top film (longitudinal direction: 250 mm, transverse direction: 200 mm, depth: 10 mm) under conditions of a forming temperature of 85° C., a forming time of 2.0 seconds, a degree of vacuum of 10 mbar and a drawing ratio of 1.2. The top film was oppositely placed on the bottom film filled with the content, and the top film and the bottom film were heat sealed under conditions of 130° C. for 2 seconds in a vacuum chamber while the inside was being evacuated. Then, after the top film and the bottom film were cut so as to form a flange portion with a length at the cutting of 20 mm, the obtained product was immersed into a shrinker (hot water bath) for heat shrinking under conditions of 85° C. for 1 second to try to obtain the deep drawing packaged product. As a result, seal breakage occurred because too much shrinkage of the top film occurred during heat shrinkage.

Comparative Example 7

A top film and a bottom film used in this Comparative Example were obtained in the same way as Example 1 except that layer structure, film thickness and film forming (stretching-relaxation) conditions were changed as described in Table 5.

Then, as a practical test, the bottom film was deep drawn by a mold for the bottom film (circular form having a diameter of 98 mm, depth: 30 mm) under conditions of a forming temperature of 100° C., a forming time of 2 seconds, and a drawing ratio of 2.2 using a deep drawing machine "FV-603" manufactured by Omori Machinery Co., Ltd. Five sheets of rubber plate (diameter: 95 mm, circular form, thickness: 5 mm, weight: 60 g per sheet) were placed as the content in the formed concave portion. Then, the top film was used without deep drawing. The top film was placed on the bottom film filled with the content, and the top film and the bottom film were heat sealed under conditions of 130° C. for 2 seconds in a vacuum chamber while the inside was being evacuated. Then, after the top film and the bottom film were cut so as to form a flange portion with a length at the cutting of 30 mm, the obtained product was immersed into a shrinker (hot water bath) for heat shrinking under conditions of 85° C. for 1 second to obtain the deep drawing packaged product.

For the obtained deep drawing packaged product which did not satisfy the conditions according to the present invention, the sealing position of the top film and the bottom film was eccentrically located in the top film side, and the result was unsatisfactory.

INDUSTRIAL APPLICABILITY

As described above, according to the present invention, it is possible to provide a deep drawing packaging container and a deep drawing packaged product which are sufficiently prevented from generation of wrinkles in the packaged product even when irregular shapes of contents such as meat is filled and packaged; provides small flange portion because of tight fitness to contents even a margin ratio of the container being large; and which is possible to be a packaging form similar to the bag-type vacuum packaging by locating the seal position of the bottom film and the top film in near-central part in a thickness direction, and methods for manufacturing the same.

Accordingly, the present invention is very useful as a technology in relation with deep drawing package for which a filling rate is easily improved compared with a conventional bag-type vacuum packaging, and consequently laborsaving and cost reduction become possible.

The invention claimed is:

1. A deep drawn packaging container comprising: a top film made of a first heat shrinkable multilayer film; and a bottom film made of a second heat shrinkable multilayer film, the deep drawn packaging container being formed by deep drawing, so that a drawing ratio ($D_1$) of the top film and a drawing ratio ($D_2$) of the bottom film satisfy the following conditions:

$D_1$=1.1 to 4.0;

$D_2$=1.5 to 5.0; and $(D_2/D_1)$=1.05 to 4.55, wherein a hot-water shrinkability ($S_{M1}$) in a longitudinal direction and a hot-water shrinkability ($S_{T1}$) in a transverse direction of the first heat shrinkable multilayer film and a hot-water shrinkability ($S_{M2}$) in a longitudinal direction and a hot-water shrinkability ($S_{T2}$) in a transverse direction of the second heat shrinkable multilayer film satisfy the following conditions:

$S_{M1}$=5 to 40%;

$S_{T1}$=5 to 40%;

$S_{M2}$=2 to 25%;

$S_{T2}$=2 to 25%;

$(S_{M1}/S_{M2})$=1.2 to 12; and $(S_{T1}/S_{T2})$=1.2 to 12, (where the hot-water shrinkability is a shrinkability (%) after immersing the heat shrinkable multilayer film before drawing in hot water of a temperature of 90° C. for 10 seconds).

2. The deep drawn package container according to claim 1, wherein each of the first heat shrinkable multilayer film and the second heat shrinkable multilayer film comprises at least an outer layer made of a first thermoplastic resin, an intermediate layer made of a polyamide-based resin and an inner layer made of a sealant resin.

3. The deep drawn package container according to claim 1, wherein a total thickness ($T_1$) of the first heat shrinkable multilayer film before drawing and a total thickness ($T_2$) of the second heat shrinkable multilayer film before drawing satisfy the following conditions:

$T_1$=20 to 120 μm;

$T_2$=45 to 200 μm; and $(T_2/T_1)$=1.1 to 10.

4. A deep drawn packaged product comprising:
a packaging container obtained by sealing and further heat-shrinking the top film and the bottom film of the deep drawn packaging container according to claim 1; and
contents placed inside the packaging container.

5. A method for manufacturing a deep drawn packaging container comprising a top film made of a first heat shrinkable multilayer film and a bottom film made of a second heat shrinkable multilayer film, the method comprising the steps of:
obtaining the first heat shrinkable multilayer film and the second heat shrinkable multilayer film in which a hot-water shrinkability ($S_{M1}$) in a longitudinal direction and a hot-water shrinkability ($S_{T1}$) in a transverse direction of the first heat shrinkable multilayer film and a hot-water shrinkability ($S_{M2}$) in a longitudinal direction and a hot-water shrinkability ($S_{T2}$) in a transverse direction of the second heat shrinkable multilayer film satisfy the following conditions:

$S_{M1}$=5 to 40%;

$S_{T1}$=5 to 40%;

$S_{M2}$=2 to 25%;

$S_{T2}$=2 to 25%;

$(S_{M1}/S_{M2})$=1.2 to 12; and $(S_{T1}/S_{T2})$=1.2 to 12, (where the hot-water shrinkability is a shrinkability (%) after immersing the heat shrinkable multilayer film before drawing in hot water of a temperature of 90° C. for 10 seconds); and
performing deep drawing so that a drawing ratio ($D_1$) of the top film and a drawing ratio ($D_2$) of the bottom film satisfy the following conditions:

$D_1$=1.1 to 4.0;

$D_2$=1.5 to 5.0; and $(D_2/D_1)$=1.05 to 4.55.

6. The method for manufacturing a deep drawn packaging container according to claim 5, wherein each of the first heat shrinkable multilayer film and the second heat shrinkable multilayer film comprises at least an outer layer made of a first thermoplastic resin, an intermediate layer made of a polyamide-based resin and an inner layer made of a sealant resin.

7. The method for manufacturing a deep drawn packaging container according to claim 5, wherein a total thickness ($T_1$) of the first heat shrinkable multilayer film before drawing and a total thickness ($T_2$) of the second heat shrinkable multilayer film before drawing satisfy the following conditions:

$T_1$=20 to 120 μm;

$T_2$=45 to 200 μm; and $(T_2/T_1)$=1.1 to 10.

8. A method for manufacturing a deep drawn packaged product comprising the steps of:
placing contents in a space between the top film and the bottom film of the deep drawn packaging container comprising: a top film made of a first heat shrinkable multilayer film; and a bottom film made of a second heat shrinkable multilayer film, the deep drawn packaging container being formed by deep drawing, so that a drawing ratio ($D_1$) of the top film and a drawing ratio ($D_2$) of the bottom film satisfy the following conditions:

$D_1$=1.1 to 4.0;

$D_2$=1.5 to 5.0; and $(D_2/D_1)$=1.05 to 4.55, wherein a hot-water shrinkability ($S_{M1}$) in a longitudinal direction and a hot-water shrinkability ($S_{T1}$) in a transverse direction of the first heat shrinkable multilayer film and a hot-water shrinkability ($S_{M2}$) in a longitudinal direction and a hot-water shrinkability ($S_{T2}$) in a transverse direction of the second heat shrinkable multilayer film satisfy the following conditions:

$S_{M1}$=5 to 40%;

$S_{T1}$=5 to 40%;

$S_{M2}$=2 to 25%;

$S_{T2}$=2 to 25%;

$(S_{M1}/S_{M2})$=1.2 to 12; and $(S_{T1}/S_{T2})$=1.2 to 12, (where the hot-water shrinkability is a shrinkability (%) after immersing the heat shrinkable multilayer film before drawing in hot water of a temperature of 90° C. for 10 seconds); and
sealing and further heat-shrinking the top film and the bottom film.

* * * * *